United States Patent [19]

Standke

[11] Patent Number: 4,802,621
[45] Date of Patent: Feb. 7, 1989

[54] THERMAL MODULATING CONTROL VALVE

[75] Inventor: Helmut Standke, Woodland Hills, Calif.

[73] Assignee: Consolidated Controls Corporation, Bethel, Conn.

[21] Appl. No.: 911,335

[22] Filed: Sep. 25, 1986

[51] Int. Cl.$^4$ ........................................... G05D 23/02
[52] U.S. Cl. ............................... 236/93 R; 137/625.3; 137/625.38; 236/102; 251/121; 251/127
[58] Field of Search ..................... 236/93 R, 102, 103; 137/625.3, 625.38; 251/127, 121, 206

[56] References Cited

U.S. PATENT DOCUMENTS

| | | | |
|---|---|---|---|
| 809,941 | 1/1906 | Glucker | 236/102 X |
| 1,726,068 | 8/1929 | Hoeschen | 236/102 X |
| 1,995,385 | 3/1935 | Foote | 236/102 X |
| 2,565,713 | 8/1951 | Allen | 236/102 X |
| 3,645,108 | 2/1972 | Houk | 236/49 X |
| 3,794,063 | 2/1974 | Carroll et al. | 137/625.3 X |
| 3,955,759 | 5/1976 | Knapp | 137/625.38 X |
| 3,990,475 | 11/1976 | Myers | 137/625.3 |
| 4,471,809 | 9/1984 | Thomsen et al. | 137/625.3 X |

Primary Examiner—William E. Tapolcai
Attorney, Agent, or Firm—L. G. Vande Zande

[57] ABSTRACT

A thermal modulating control valve for providing bleed air for aircraft anti-icing purposes includes a valve chamber with an inlet for high temperature bleed air and an outlet for temperature modulated bleed air for aircraft systems. A modular valve mechanism is mounted in a chamber for regulating the flow of hot bleed air to the outlet in response to the temperature of the supply. The valve includes a first wall section having a plurality of spaced apart flow orifices or openings in one face and fixedly secured adjacent the inlet end of the chamber, and a second confronting wall section having a plurality of spaced apart flow orifices or openings provided to directly confront the orifices in the first wall section. The wall sections are movable relative to one another in response to the temperature of the bleed air at the inlet end so as to displace the respective sets of flow orifices in and out of registry for controlling the flow of bleed air supplied to the outlet of the valve. A solenoid controlled on/off poppet valve is provided to supply and shut off bleed air to the thermal modulating valve mechanism.

9 Claims, 4 Drawing Sheets

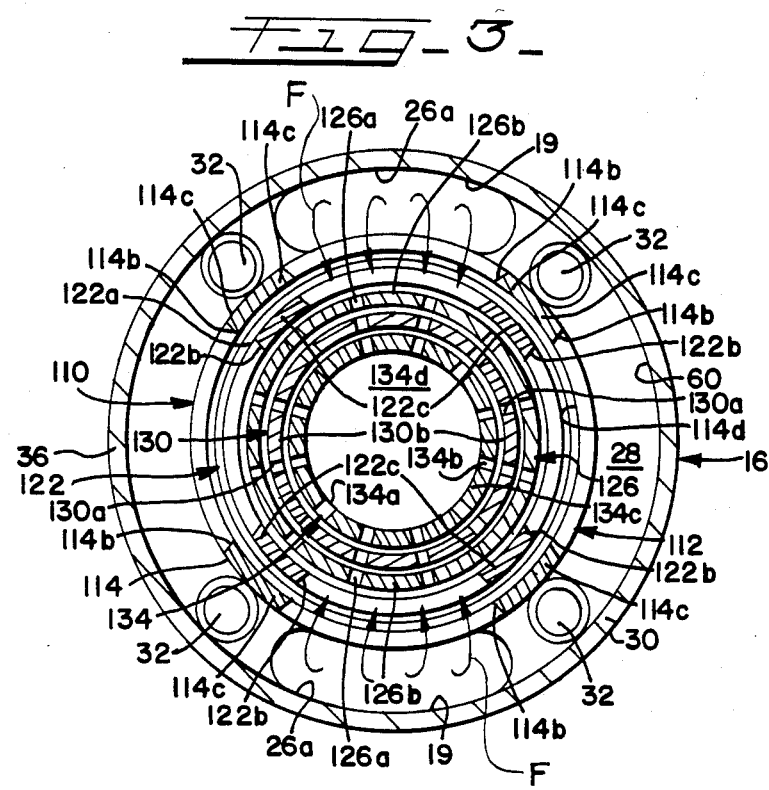
FIG_3_
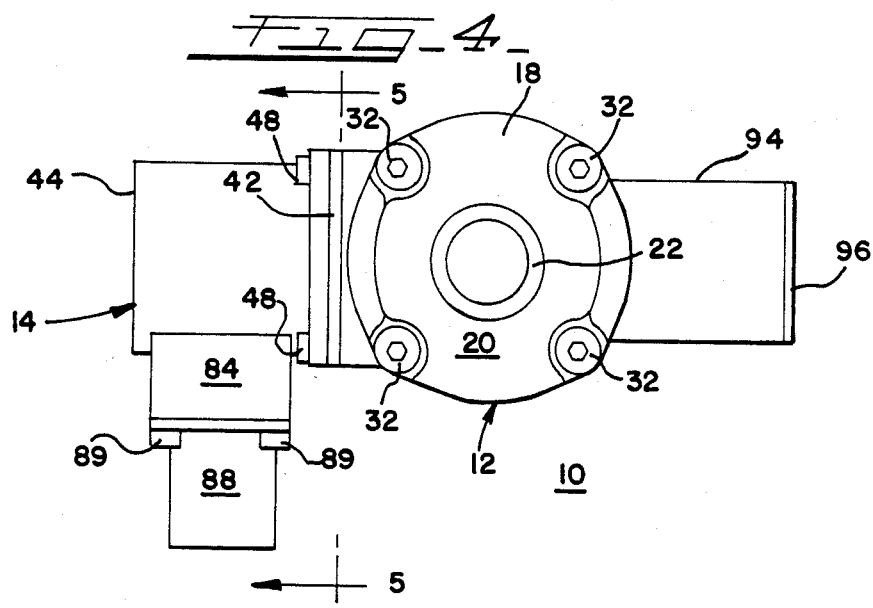
FIG_4_

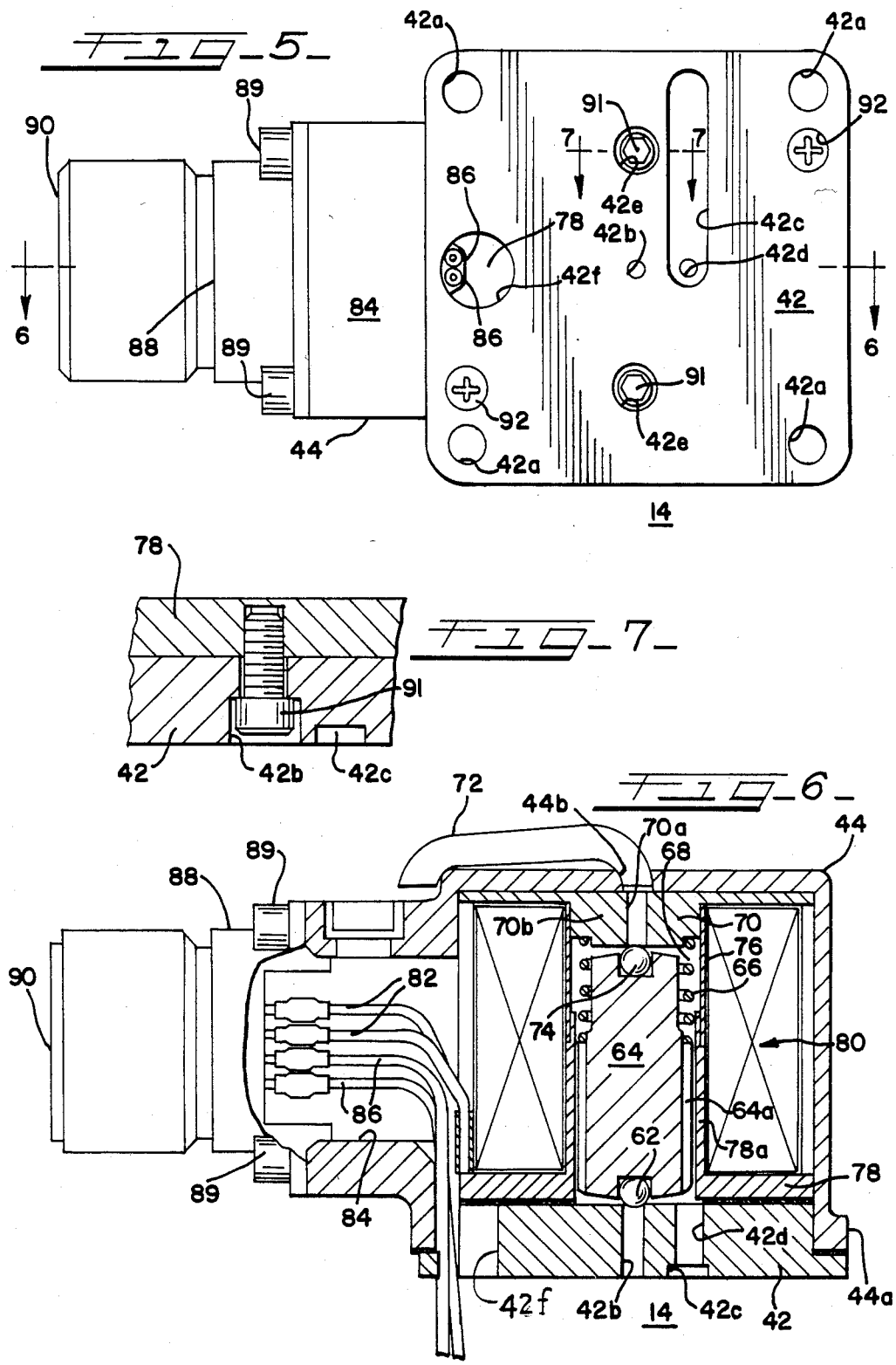

THERMAL MODULATING CONTROL VALVE

BACKGROUND OF THE INVENTION

1. Field of the Invention

The present invention relates to a thermal modulating control valve and more particularly to a modular type thermal modulating control valve especially adapted for controlling the flow of high temperature bleed air for use in aircraft anti-icing and other systems. In modern day aircraft powered by jet engines many aircraft systems utilize high temperature pressurized air taken from the compressor section of the engine and such high temperature pressurized air is known as bleed air. Bleed air is utilized for aircraft anti-icing, cabin pressurization and air conditioning and for powering air turbines used for engine starting and auxiliary power generation, etc.

2. Background of the Prior Art

Control valves for use on modern day aircraft for selectively controlling the flow and distribution of bleed air for operating aircraft systems have been provided.

It is an object of the present invention to provide a new and improved thermal modulating control valve and more particularly a thermal modulating control valve for use with high temperature pressurized bleed air used for aircraft systems such as anti-icing, cabin pressurization and air conditioning and air turbine drives, etc.

It is another object of the present invention to provide a new and improved bleed air valve for precisely and reliably controlling the flow of aircraft bleed air supplied to aircraft system components.

Another object of the present invention is to provide a new and improved thermal modulating control valve of the type described employing a modular type construction for facilitating assembly, testing, design changes and production procedures.

Another object of the present invention is to provide a new and improved thermal modulating control valve for aircraft bleed air which is easily and accurately calibrated and which does not require bi-metallic strips or springs in a thermal modulating component thereof.

Yet another object of the present invention is to provide a new and improved thermal modulating control valve of the character described which is light in weight, relatively small in size, extremely reliable in operation with a long and useful life cycle in terms of number of cycles of operation and which valve has a fail-safe feature in the event of electrical failure.

Still another object of the present invention is to provide a new and improved thermal modulating control valve of the character described comprising an assembly of three modular type components including an inlet section, a thermal modulator and a control solenoid.

Yet another object of the present invention is to provide a new and improved thermal modulating bleed air control valve of the character described in the preceding objects wherein the major assemblies can be readily attached and detached with respect to one another as required for calibration, service and testing.

Yet another object of the present invention is to provide a new and improved thermal modulating control valve of the character described which includes a solenoid controlled on/off valve in combination with a thermal modulating valve for regulating flow to the systems in response to the temperature of bleed air supplied to the inlet section.

BRIEF SUMMARY OF THE INVENTION

The foregoing and other objects and advantages of the present invention are accomplished in a new and improved thermal modulating control valve of the character described especially adapted for controlling high temperature pressurized bleed air for use in aircraft systems such as anti-icing, cabin pressurization and air conditioning and air turbine drives, etc. The control valve includes a valve chamber having an inlet for receiving bleed air and an outlet for supplying temperature modulated bleed air to be used in various aircraft systems. A modulating valve is provided in the chamber for regulating the flow of bleed air to the outlet in response to the temperature of the bleed air supplied to the inlet, and includes a first wall having a plurality of spaced apart flow orifices in a face thereof and fixedly secured to an end adjacent the inlet of the valve chamber. A second wall also provided with a plurality of spaced apart flow orifices is mounted in confronting position relative to the first wall and is movable in response to the temperature of the bleed air supplied so as to provide relative displacement of the respective sets of flow orifices in the confronting first and second walls to increase and decrease the effective flow area therebetween in response to temperature variations. The valve includes a solenoid controlled, on/off shutoff valve operable to direct bleed air into the inlet of the chamber when turned on to provide temperature regulated bleed air needed for operation of various aircraft systems.

BRIEF DESCRIPTION OF THE DRAWINGS

For a better understanding of the present invention, reference should be had to the following detailed description taken in conjunction with the drawings in which:

FIG. 3 is a transverse cross-sectional view of the valve taken substantially along lines 3—3 of FIG. 1;

FIG. 4 is an end elevational view of the valve looking in the direction of arrows 4—4 of FIG. 1;

FIG. 5 is a cross-sectional view taken substantially aong lines 5—5 of FIG. 4;

FIG. 6 is a cross-sectional view taken substantially along lines 6—6 of FIG. 5; and FIG. 7 is an enlarged fragmentary cross-sectional view taken substantially along lines 7—7 of FIG. 5.

DETAILED DESCRIPTION OF A PREFERRED EMBODIMENT

Figure 1:
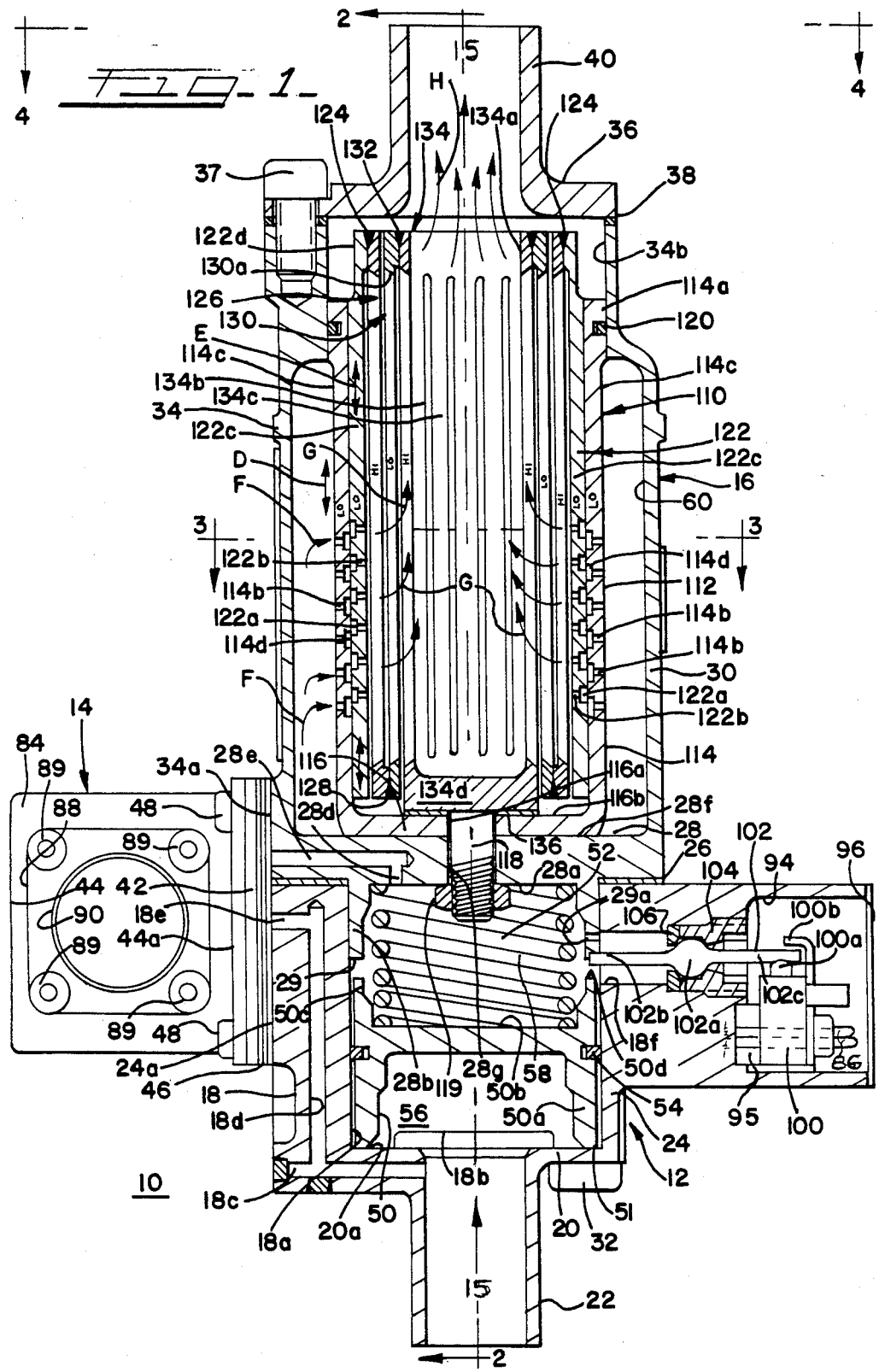
FIG. 1 is a longitudinal cross-sectional view of a new and improved thermal modulating control valve for bleed air constructed in accordance with the features of the present invention.

Referring now more particularly to the drawings, therein is illustrated a new and improved thermal modulating control valve 10 especially adapted for use in controlling the flow of high temperature compressed air (hereinafter referred to as bleed air) for use in aircraft systems such as anti-icing systems, cabin pressurization and air conditioning systems, air turbine drive systems, etc. The control valve 10 is of a modular construction and includes an inlet assembly 12, a solenoid assembly 14 and a thermal modulating valve assembly 16, which modules are detachably interconnected to one another. The inlet assembly is effective to open and close a valve inlet as the solenoid assembly is deenergized and energized by the solenoid module and the thermal modulating valve assembly is operative to regulate the outlet flow of bleed air according to the temperature of the bleed air supplied so that as the temperature increases, the flow rate through the valve is decreased and vice versa.

The modular construction in accordance with the invention facilitates the assembly, testing, design changes and production of the control valve 10. The solenoid assembly 14 and the thermal modulating valve assembly 16 are both assembled and tested as independent units separate from the combined modules making up the complete valve 10.

The inlet assembly or section 12 includes a body or poppet housing 18 of cup-shaped configuration (FIGS. 1 and 2) having an annular outer end wall 20 at the inlet end of the valve assembly 10 and formed with an outwardly extending, axially aligned, inlet nipple 22 which is adapted to be connected to a source of bleed air such as the compressor section of an aircraft jet engine or a bleed ar manifold in the aircraft. The inlet body 18 includes an annular, cylindrical outer side wall 24 which opens at an inner end opposite the end wall 20 and the inner end abuts an annular gasket 26 of copper interposed adjacent an annular, inner end wall 28 of a cup-shaped valve chamber 30 of the thermal modulating valve assembly 16. The inlet body 12 and the valve chamber 30 are aligned in coaxial alignment along a central longitudinal axis 15—15. The inlet body 18 and the valve chamber 30 are assembled together with the gasket 26 between confronting portions by a plurality of elongated bolts 32 spaced equilaterally around the central axis 15—15 of the control valve 10 as shown best in FIGS. 3 and 4. The thermal modulating valve chamber 30 includes a generally cylindrical side wall 34 and is closed at the outer end by an outlet end wall 36 sealed to the outer end face of the side wall by a copper gasket 38 and the outlet is provided with an outwardly extending, outlet nipple 40 in coaxial alignment with the inlet nipple 22 and adapted to supply a flow of temperature regulated and controlled bleed air to aircraft systems which may be connected to the nipple through appropriate conduits and tubing systems.

A side wall 34 of the valve chamber 30 and the side wall 24 of the inlet body 18 are formed with respective, adjoining flatted segments or flats 34a and 24a in coplanar alignment as shown in FIG. 1 in order to provide a flat mounting surface for a solenoid valve plate 42 which closes off the inner end of a flanged, solenoid housing 44 of the solenoid assembly 14. The valve plate 42 has planar, spaced apart, parallel inner and outer faces and the outer face is secured against an asbestos, heat insulating sealing gasket 46 which bears against the flats 24a and 34a on the respective component side walls 24 and 34. The solenoid housing 44 is secured to the valve chamber 30 and the inlet body 18 by a plurality of cap screws 48 which pass through a peripheral flange 44a of the solenoid housing and through apertures 42a at the corners of the valve plate 42. The cap screws are threaded into apertures provided in the valve chamber and the inlet body. The heads of all assembly bolts 32 and 48 are positioned external to any flow passages in the thermal modulating control valve 10 and may be safety wired in accordance with standard aircraft safety procedures.

In accordance with the present invention, the inlet assembly 12 is provided with a solenoid controlled on-/off poppet valve 50 which is mounted for axial sliding movement within an enlarged cylindrical bore 18a defined in the inlet body 18. The poppet is designed to open (FIG. 2) and close (FIG. 1) with respect to a valve seat surface 20a formed around the inlet nipple 22 on the inside annular face of the end wall 20. The poppet 50 includes a cylindrical sleeve 50a extending outwardly in an axial direction from a radial wall portion 50b of circular shape and an outer edge 51 of the sleeve 50a forms an annular valve seating surface for engaging the inside face 20a of the end wall 20 to shut off an incoming flow of bleed air supplied to the inlet nipple 22 when the poppet valve is closed.

Figure 2:
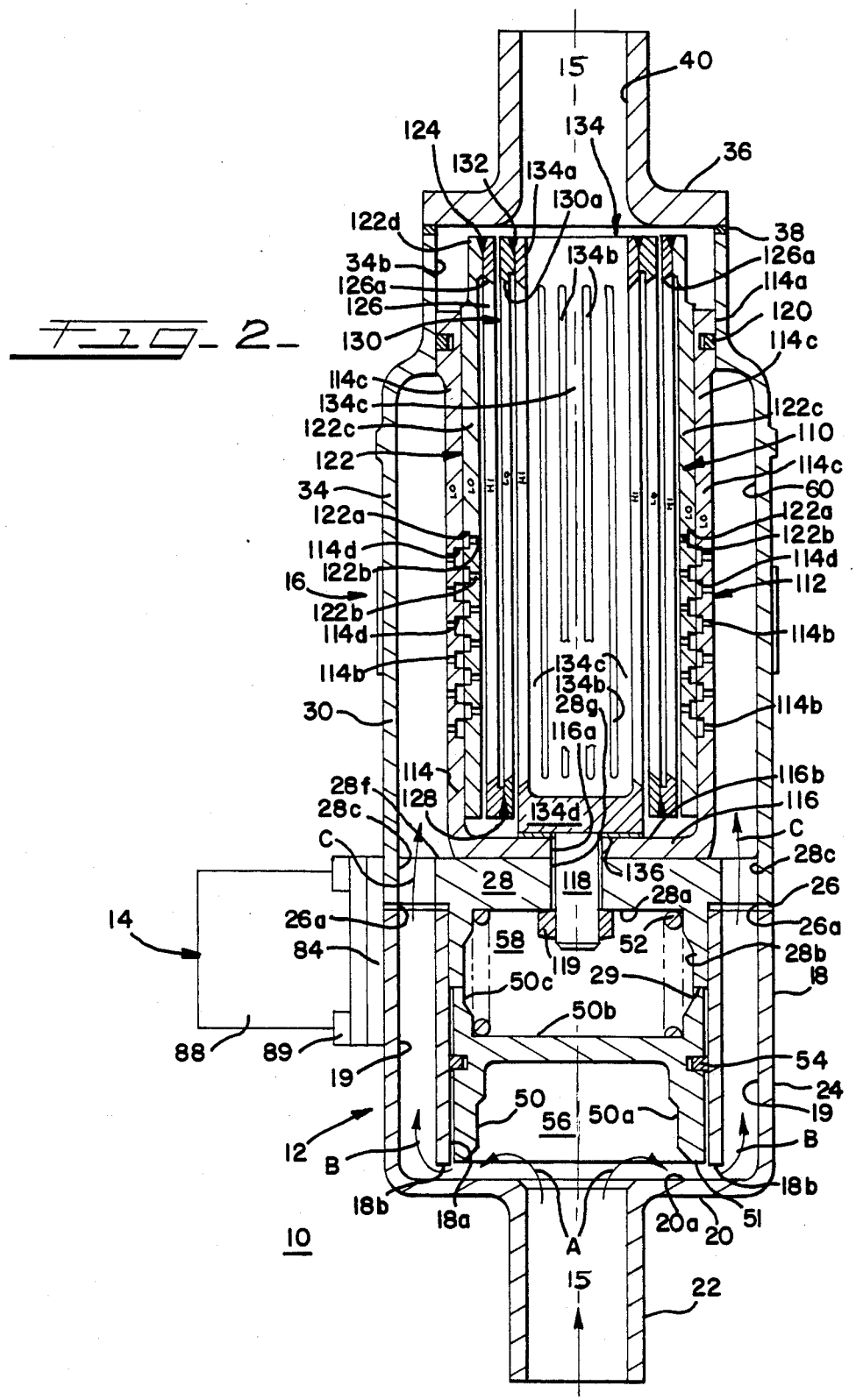
FIG. 2 is a cross-sectional view similar to FIG. 1 taken on a plane at right angles thereto as indicated by the line 2—2 of FIG. 1.

The poppet valve also includes an inwardly extending cylindrical skirt 50c projecting toward the valve chamber end wall 28 and a coiled valve spring 52 is seated within the interior of the skirt 50c and against the wall 28 to bias the valve poppet 50 towards the closed position (FIG. 1). The inner end of the coiled valve spring 52 bears against an annular wall face 28a facing the inside surface of the radial wall 50b of the poppet. Outwardly around the annular surface 28a, the end wall 28 of the valve chamber 30 is provided with an axially extending generally cylindrical skirt wall 28b which is seated within the bore 18a of the inlet body 18 to insure coaxial alignment between the members 18 and 30. The skirt 28b includes a radial outer edge 29 forming a stop surface for engaging a mating surface 50d of the poppet skirt so as to limit the inward travel of the poppet valve when moved toward an open position as shown in FIG. 2. A piston ring 54 of Nitronic 60 material is mounted in an annular groove on the outer surface of the poppet 50 adjacent the radial wall 50b in order to slidably seal between the valve poppet and the surface of the bore 18a.

The radial wall 50b of the poppet valve divides the inlet body 12 into an outer, bleed air inlet section 56 in direct communication with the inlet nipple 22 and an inner control chamber 58 disclosed between the radial poppet valve wall 50b and the valve chamber end wall 28a. When the fluid pressure within the chambers 56 and 58 is substantially equal the valve spring 52 is effective to bias and maintain the poppet valve 50 in an inlet closing position as shown in FIG. 1, wherein incoming bleed air is shut off by the engagement between the poppet seating surface 51 and the inside annular face 20a of the end wall 20. When the poppet valve 50 is moved axially inwardly toward the open position of FIG. 2 (compressing the valve spring 52 somewhat), the surface 51 moves away from the poppet the wall surface 20a as shown in FIG. 2, and bleed air flows into the outer inlet chamber 56 as indicated by the arrows "A" (FIG. 2). Incoming bleed air passes radially outwardly of the chamber 58 through a pair of diametrically opposed, supply ports 18b formed in the bore 18a of the poppet chamber adjacent the end wall 20. This bleed air moves through the ports into a pair of longitudinally extending, diametrically opposed flow passages 19 as indicated by the arrows "B", through matching openings 26a in the gasket 26 and matching ports 28c provided in the end wall 28 into an annular, outer valve chamber section 60 formed by the side wall 34 of the valve chamber 30 (as indicated by the arrows "C").

The poppet valve 50 in the inlet assemly 12 thus controls the flow of incoming bleed air to the thermal modulating valve assembly 16. When the poppet valve is closed no bleed air is supplied to the thermal modulating valve assembly and when the poppet valve is opened (FIG. 2), bleed air passes through the inlet assembly 12 and passages 19 thereof directly into the outer annular chamber 60 of the thermal modulating valve assembly 16. The solenoid assembly 14 is interconnected and functions to open and close the poppet valve 50 and includes an electrical solenoid adapted to be controlled by a solenoid switch appropriately located in the cockpit of an aircraft or other appropriation locations therein.

Referring now to FIGS. 1 and 4–6, the inlet body 18 is provided with a small radial passage 18c having an inner end in direct communication with the interior of the inlet nipple 22. The passage 18c is in communication with a longitudinally extending passage 18d, which later passage in turn is in communication with a short radial passage 18e having an outer end opening onto the flat surface 24a for communication with a central passage 42b provided in the valve plate 42.

Referring to FIG. 6, the inner end of the passage 42b is shown as being closed by a small, spherical valve ball 62 seated in a recess provided in the end of a magnetic armature 64 which is biased by a spring 66 to seat the ball against the inner end of the passage and thereby prevent the entry of bleed air into the interior of the solenoid chamber 44. The armature 64 is mounted in a central chamber 68 and is provided with a plurality of longitudinal, spaced apart ribs or flutes 64a as illustrated in FIG. 6, to guide the armature for axial sliding movement therein. The cylindrical armature chamber 68 is closed at an inner end by the valve plate 42 and provided with an annular outer end wall 70 having a central, exhaust passage 70a therein for exhausting bleed air to the atmosphere through an exterior vent hose 72 communicating with the outer end of the passage 70a through an opening 44b provided in the outer wall of the solenoid housing 44 (FIG. 6).

The magnetic armature 64 also includes a second spherical valve element or ball 74 mounted in an axial recess in the outer end face of the armature and this ball is adapted to seat against the member 70 around the periphery of the exhaust passage 70a. The armature is dimensioned in length so that when the inner ball 62 is seated to close the passage 42b, the outer ball 74 is open with respect to the passage 70a and, in the alternative, when the armature is pulled in by energization of the solenoid, the outer ball 74 is seated against the inner end of the passage 70a, and the inner end ball 62 is out of seating engagement with the passage 42b to permit bleed air to flow into the armature chamber 68 through the passage.

In accordance with the invention, the armature chamber 68 is defined by a fixed, cylindrical wall 76 secured around a thickened circular central boss portion 70b on the outer circular annular wall plate 70. The tubular chamber wall 76 cooperates with an integral, cylindrical, chamber wall 78a formed on an annular, circular shaped, inner wall plate 78 having a radial planar outer face portion seated against the outer face of the adjacent valve plate 42 as shown in FIG. 6. The circular radial portions of the plates 70 an 78 and the outer surface portions of cylindrical sleeves 76 and 78a define a spool-like base for accommodating the annular winding of an electrical, DC powered solenoid coil 80 which is normally energized by DC current when the aircraft electrical system is powered up. DC current is supplied through lead wires 82 and is controlled by a switch (not shown) remote from the solenoid assembly 14. When the solenoid coil 80 is deenergized by the switch or by electrical failure, the spring 66 biases the ball 62 on the armature 64 to close the passage 42b on the valve plate 42. In this condition, atmospheric air pressure obtains in the armature chamber 68 through the vent hose 72 and the passage 70a in the outer annular end wall 70. The flutes or ribs 64a on the armature 64 permit atmospheric air pressure to be maintained within an inner end of the armature chamber 68 and this same atmospheric pressure also obtains in the inner control valve chamber 58 because of a direct communication between the chamber via interconnected passageways 28d and 28e (FIG. 1) in the valve chamber end wall 28. The passages are in communication with the inner end of the armature chamber 68 through a slot 42c and passageway 42d in the valve plate 42 as shown in FIGS. 5 and 6.

When the solenoid winding 80 is energized through the leads 82, the armature 64 is pulled in to compress the armature spring 66 and seat the ball 74 against the exhaust passage 70a in the outer annular end wall or plate 70. When this occurs, the ball 62 at the opposite inner end of the armature moves away from the passage 42b and permits the pressurized bleed air from the passageway 18e to flow through the passage 42b into the armature chamber and through the passages 42d, slot 42c and passages 28e and 28d into the inner poppet valve control chamber 58. When pressurized bleed air is present on both opposite sides of the radial wall 50b of the poppet valve 50, the valve is maintained in the closed position as shown in FIG. 1 by the valve spring 52. When the solenoid winding 80 is deenergized, either inadvertently by failure of the aircraft electrical system or by activation of the cockpit switch controlling DC power to the leads 82, the inner, control valve chamber 58 is exhausted to the atmosphere and the poppet valve 50 moves to the open position because of the unbalanced pressure on the radial valve wall 50b as long as pressurized bleed air is present in the inlet nipple 22. This action admits pressurized bleed air into the passages 19 through the ports 18b and bleed air is then available to the valve chamber 60 of the thermal modulating valve assembly 16. Accordingly, bleed air is available for anti-icing and other systems in an aircraft even though electrical failure has occurred. This failsafe feature provides a readily available supply of bleed air for anti-icing purposes even though the aircraft electrical system may have failed.

The solenoid housing 44 is formed with a conduit, inlet section 84 for the leads 82 and for a separate pair of indicator leads 86 bundled therewith. The conduit inlet section 84 is open at the outer end in order to receive a flanged, attachment fitting 88 secured in position therein by cap screws 89. The fitting 88 is formed with an annular, conduit connector section 90 for connection to electrical conduit in the aircraft.

The valve plate 42 is secured to the inner, armature chamber end wall or plate 78 by a pair of cap screws 91 having heads seated in a pair of circular recesses 42e provided in the valve plate. In turn, the valve plate 42 is secured to the inner, flanged end of the solenoid housing 44 by a pair of countersink head cap screws 92 so that the entire solenoid housing assembly can be rapidly assembled and disassembled from the flats 34a and 24a tightening and loosening the cap screws 48 as previously described.

The valve plate 42 also includes a circular opening 42f (FIG. 5) for accommodating the leads 86 which extend into a remote, integral switch chamber 94 formed on the opposite side inlet body 18 (FIG. 4) and provided with a circular, removable closure plate 96. The switch chamber 94 is adapted to enclose and house a position indicator switch 100 connected to the indicator leads 86. The switch 100 is insulated electrically and thermally from the chamber wall on a member 95 and includes an operator 100a which is engaged by an outer end portion 102c of a poppet valve position indicator lever 102. The lever 102 extends axially along a passage 18f formed in the inlet body 18 to extend between the main bore 18a and the inner end of the switch chamber 94. An inner end of passage 18f is in direct communication with the inner poppet control chamber 58 and an outer threaded segment of the passage 18f is designed to receive a threaded, annular, ball retainer fitting 104, and an annular, retaining sealing element 106. These retainers cooperate to engage a central, spherical portion 102a on the indicator lever and provide a pressure seal between the chambers 58 and 94 and yet permit pivotal movement of the indicator lever 102 about the center of the ball-like spherical section at the middle thereof.

Referring to FIG. 1, when the poppet valve 50 is closed as illustrated, the operator 100a of the indicator switch biases the outer end portion 102c of the indicator lever 102 toward a lever stop element 100b. When the poppet valve 50 is moved from the closed position of FIG. 1 to the open position of FIG. 2, an inner end portion of the indicator lever 102b becomes engaged by the stop surface 50d of the poppet skirt and this causes the lever to pivot in a clockwise direction as viewed in FIG. 1 about the central ball segment 102a. This pivoting action of the lever 102 causes the switch operator 100a to be depressed and activates the switch 100 to provide an electrical indication via the leads 86 that the poppet valve 50 has opened. When the poppet valve 50 returns to the closed position as shown in FIG. 1, the stop surface 50d of the poppet skirt moves away from engagement with the inner end portion 102b of the indicating lever 102 and the switch operator 100a of the indicator switch 100 again biases the outer end portion 102c of the lever back toward the limit stop 100b. In this position, the switch contacts are open and this action provides an electrical indicator that the poppet valve 50 is now closed. The lever 102 and retainers 104 and 106 are formed of 304 CRES stainless steel in order to effectively operate at the relatively high temperatures of the bleed air supplied.

Referring now more particularly to FIGS. 1, 2 and 3, the thermal modulating valve assembly 16 of the present invention includes a thermal modulating valve mechanism generally indicated as a whole by the numeral 110. The valve mechanism is generally cylindrical in shape and is detachably mounted in the valve chamber 30 inwardly of the outer, annular portion 60 which receives a supply of bleed air when the poppet valve 50 is opened. The valve mechanism 110 can be bodily removed as a unit from the valve chamber 30 after removal of the outer end wall 36 normally held in place by cap screws 37 and the bolts 32. The valve mechanism includes a cup-shaped, outer sleeve member 112 haing a cylindrical side wall 114 in coaxial alignment with the nipple inlet 22 and the outlet nipple 40. At the inner end, the valve sleeve is provided with an integral, radial annular end wall 116 having a surface secured to abut an opposite face 28f of the valve chamber end wall 28. The circular end wall 116 is provided with a central circular opening as illustrated, to accommodate a threaded stud 118 which projects downwardly through a central aperture 28g provided in the wall 28 and receives a locknut 119 mounted in the inner poppet control chamber 58 for securing the thermal valve mechanism 110 in place. The threaded stud 118 projects through an opening 116a provided at the center of the end wall 116 of the outer valve sleeve 112.

At the outer end, the cylindrical side wall 114 of the valve sleeve is formed with an enlarged annular piston-like section 114a of slightly greater 0.D. adapted for longitudinal sliding movement within a cylindrical bore section 34b formed in of the valve chamber side wall and defining a cylinder surface for cooperating with the piston section 114a. A piston ring 120 of Nitronic 60 material is mounted in a groove provided in the piston portion 114a and the piston ring seals tightly against the bore surface 34b while accommodating relative linear expansion and/or contraction between the valve chamber side wall 34 and the side wall 114 of the valve sleeve 112 as indicated by the arrow "D" in FIG. 1. The outlet end wall 36 and the interior bore surface 34b of the valve chamber side wall define an outlet chamber for supplying bleed air to the various aircraft systems on a thermal modulated control basis.

In accordance with the present invention, the cylindrical wall 114 of the cup-shaped valve sleeve 112 is formed with a plurality of circumferentially extending longitudinally spaced apart, apertures or flow orifices 114b and as shown in FIG. 3, a total of four orifices 114b are provided around the whole circumference of the side wall 114 at a plurality of longitudinal spaced apart portions on radial planes on the sleeve spaced from the fixed end wall 116. Between adjacent ends of each pair of orifices in a given ring of orifices, a longitudinally extending land portion 114c (FIGS. 1 and 2) is formed. Each of the four arcuate slots or apertures 114b in a given radial plane or circumferece around the wall 114 is in communication with a common annular groove 114d having a depth substantially less than the total thickness of the sleeve wall 114 and a width in a longitudinal direction, considerably larger than the width of the apertures or orifices 114b. The longitudinally spaced apart continuous circumferential grooves 114d are formed on the generally cylindrical inside wall face of the side wall structure 114. When bleed air is introduced into the outer chamber 60, the sleeve 112 begins to elongate and the piston portion 114a moves outwardly in the bore 34b toward the end wall 36.

When the supply of hot pressurized bleed air is cut-off, the sleeve 112 begins to contract in length and the piston portion 114a moves inwardly away from the outer end wall 36. The piston ring 120 provides a continuous seal as the sleeve 112 expands and contracts between the outer chamber 60 and the bleed air outer chamber defined at the outer end of the bore 34b. The sleeve 112 is formed of Carpenter Kovar steel alloy whereas the valve chamber 30 is formed of 17-4PH CRES CSTG AMS 5343 steel alloy, both of which alloys are well able to handle the high temperatures of up to 800° F. of the bleed air supplied to the valve 10. The flow of bleed air inwardly from the outer chamber 60 toward the central axis 15—15 of the valve chamber 30 (arrows F, FIGS. 1 and 3) is regulated and controlled by the registration of the annular grooves 114d on the inner face of the sleeve wall 114 with respect to confronting annular grooves 122a on the outer, generally cylindrical surface of an inner valve sleeve or piston 122 also formed of Carpenter Kovar steel alloy.

The inner sleeve 122 is movable longitudinally relative to the outer sleeve 112 as indicated by the arrows "E" and terminates short of the radial end wall 116 at an inner end but projects outwardly beyond the piston portion 114a of the outer valve sleeve 112 at the outer end. The inner valve sleeve is formed with a plurality of longitudinally, spaced apart circumferential grooves 122a on spaced radial planes and the grooves have a width dimension in a direction longitudinally of the valve axis which is generally equal to or substantially the same as the width of the generally circumferential grooves 114d on the inside surface of the matching side wall 114 of the outer sleeve 112. Each continuous circumferential groove 122a on the outer surface of the inner sleeve 122 is in communication with four circumferentially extending, end to end spaced apart slots or orifices 122b on the inside surface of the sleeve. Between the ends of each pair of orifices 122b longitudinally extending land portions 122c are provided and each groove 122a is in communication with four slots or orifices 122b spaced apart end to end by four longitudinally extending lands 122c.

Each groove 114d on the inside surface of the outer sleeve wall 114 is adapted to register and move in and out of registration with a corresponding circumferential groove 122a on the outer surface of the inner sleeve 122 as longitudinal displacement between the sleeves takes place. This movement is responsive to the temperature of the bleed air in the chamber 60 and provides a differentiation in the effective flow area for the hot bleed air gases moving inwardly from the annular outer chamber 60 toward the central portion of the valve structure.

As shown in FIG. 2, confronting pairs of grooves 114d and 122a may be completely out of registration so that only a substantially small rate of flow is permitted whereas other temperature conditions may result in relative longitudinal expansion and/or contraction between the inner and outer sleeves 122 and 112 which provides a partial or complete registration between each pair of mating grooves 114d and 122a and accordingly a maximum effective flow area for the bleed air moving toward the outlet nipple 40.

It will thus be seen that precise control over the effective flow area is obtained in response to thermal modulating action of the respective sleeves 112 and 122 and the confronting grooves and passages therein moving longitudinally into and out of registration At an outer end portion, the inner sleeve 122 is provided with a reduced diameter end segment 122d and this segment is joined by an annular weld 124 to an outer end portion of a tubular, generally cylindrical, expander sleeve 126 having an inner end portion terminating short of the radial end wall 116. The expander sleeve 126 includes a plurality of elongated, longitudinally extending air slots 126a to permit inward flow of bleed air (arrows G) into the central portion of the valve chamber 30. Alternate longitudinal land portions 126b are provided between adjacent air flow slots 126a to provide an integral, generally cylindrical cage-like structure of the expander 126.

At an inner end portion, the expander sleeve is joined by an annular weld 128 to an inner end portion of a second inner expander sleeve 130 of generally similar construction having longitudinal air flow slots 130a and lands 130b alternating therebetween. At an outer end, the tubular expander 130 is joined by an annular weld 132 to an outer end portion of a cup-shaped support element 134 of generally cylindrical shape having a side wall 134a provided with longitudinally extending air flow slots 134b and alternate lands 134c for providing an inward flow path for the hot bleed air gases entering the outer annulus 60 for movement towards the outlet nipple 40.

The cup-shaped support element 134 includes a radial end wall 134d of circular shape integrally joined to the cylindrical side wall 134a and the threaded stud 118 projects downwardly from the end wall to support and position the support element 134 and movable expander sleeves 126 and 130 carried thereby within the chamber 30 on the end wall 28 as previously described.

In accordance with the invention, the longitudinal flow slots 126a, 130a and 134b in the expander sleeves 126 and 130 and support sleeve 134, respectively, provide a continuously open flow area or path for bleed air moving radially inwardly from the outer annular chamber 60 toward the interior of the support sleeve 134 prior to outflow (arrows H) through the outlet nipple 40 whenever respective pairs of confronting grooves 114d and 122a of the outer valve sleeve 112 and inner valve sleeve 122 are in complete or partial registration. When these grooves are completely out of registration as illustrated in FIG. 2, substantially all of the flow of bleed air to the outlet nipple 40 is shut off.

The precise amount of registration between confronting pairs of valve grooves 114d and 122a is dependent upon the initial calibration of the valve structure as determined by the thickness of one or more annular shims 136 and the temperature of the bleed air entering the outer annular chamber 60 from the passages 19. The amount of shim thickness is chosen to provide a maximum registration or effective flow area when the valve is cold so that when bleed air is initially supplied or turned on, a minimum thermal response time will be required for the valve to begin operating to provide thermal modulated bleed air flow to an anti-icing system connected downstream of the valve outlet nipple 40.

The unique, end to end sleeve construction and the nested coaxial alignment of the valve members 112 and 122, expander sleeves 126 and 130 and central support sleeve 134 provide rapid thermal response and a high value of temperature responsive sensitivity over a wide range of bleed air temperature inputs. The unique combination of different types of materials used in these valve elements is chosen because of the excellent thermal properties, availability and ease of fabrication.

The valve members 112 and 122 have a relatively low coeficient of thermal expansion, being formed of Carpenter Kovar steel alloy, whereas the inner support sleeve 134 and outer expander sleeve 126 have a relatively high coefficient of thermal expansion, being formed of Carpenter Alloy 22-3. The expander sleeve 130 (which is interconnected end to end intermediately between the inner support sleeve 134 and the outer expander sleeve 126) is formed of Carpenter Kovar steel having a relatively low coefficient of thermal expansion. Because of this unique arrangement and choice of materials, the valve 10 provides a greater amount of thermal response in terms of the amount of longitudinal movement of the inner valve sleeve 122 relative to the outer valve sleeve 112 for a given amount of temperature change than would be possible if the intermediate expander sleeve 130 was also formed of a material having a high coefficient of thermal expansion. Moreover, because the confronting outer valve sleeve wall 114 and inner sleeve 122 which change the effective flow area in response to temperature variations are made of the same material, a minimum of leakage occurs and a minimum of wear occurs which otherwise might be encountered because of differences in coefficients of thermal expansion.

For calibrating the thermal valve 110, one or more annular shims 136 formed of mica are disposed between confronting surfaces of the support end wall 134d and the inner face 116b of the radial end wall 116 of the outer valve sleeve 112. The mica shims provide for good thermal isolation between the central, cup-shaped support 134 and the cup-shaped outer valve sleeve 112.

Aside from the switch, wires, insulation and gaskets, the valve and components thereof are made entirely from stainless steels or other ferrous alloys. Bi-metallic strips are not required and no springs are required in the thermal modulating valve module 16. Initial calibration of the valve 10 is obtained by adjusting the height of the inner sleeve piston portion 122 in the outer sleeve 112 at room temperature and this adjustment can be made by the addition or deletion of thin mica shims 136 between the radial end walls 116 and 134d. This type of calibration can eliminate the need for "hot" testing as the characteristics of the valve 10 become well-known. The valve 10 is designed to have a life cycle in excess of 44,000 hours and has a fail safe feature so that the valve will remain open to supply bleed air in the event of aircraft electrical failure wherein the solenoid winding 80 cannot be energized.

Because bleed air supplied to the inlet nipple 22 may range in temperature from 200° F. to over 800° F., the choice of metals and alloys for making components of the valve system is important. For example, the inlet body 18 is cast from 17-4 PH CRES CSTG AMS 5343 stainless steel as is the poppet valve 50. The piston rings 54 and 120 are formed of Nitronic 60 stainless steel and the mating surfaces between the piston rings and internal bore 18a of the inlet body 18 and the bore 34b of the valve chamber 30 are "nitrited" for wear-resistance and no external lubricant is required. Corrosion-resistant 17-4 PH steel is used for both the inlet housing and the poppet. The indicator switch 100 is supported in the switch chamber 94 on a mica insulator 95 and the lever 102, retaining ring 106 and retainer 104 are all formed of 304 stainless steel. The spring 52 is made of Inconel AMS 5699 stainless steel and the insulating gasket 46 is formed of asbestos or similar heat insulating and electrically insulating material suitable for high temperature use.

The body of the valve chamber 30 of the thermal modulating valve assembly 16 is formed of 17-4 PH CRES CSTG AMS 5343 stainless steel like the inlet body 18 and the cup-shaped, outer valve sleeve 112 is formed of Carpenter Kovar stainless steel. The inner valve sleeve 122 or piston is also formed of Carpenter Kovar stainless steel as is the low rate expander sleeve 126 having a relatively low coefficient of thermal expansion. The cup-shaped support element 134 is formed of Carpenter ALY 22-3 stainless steel and the inner high rate expander sleeve 130 is formed of Carpenter ALY 22-3 stainless steel with a high coefficent of expansion. The outlet fitting 36 is formed of 17-4 PH CRES stainless steel as is the body 34 on which the fitting is attached thereto. The gaskets 26 and 38 are formed of copper sheeting material.

While there has been described what is at present considered to be the preferred embodiments of the invention, it will be understood that various modifications may be made therein which are within the true spirit and scope of the invention.

What is claimed as new and desired to be secured by Letters Patent of the United States is:

1. A thermo-modulating aircraft bleed air control valve comprising:
    a valve chamber having inlet means for supplying high temperature bleed air into said chamber at an inlet end and an outlet for releasing temperature modulated bleed air from said chamber at an output end; and
    valve means in said chamber between said inlet means and said outlet for regulating the flow of bleed air to said outlet in response to the temperature of said bleed air supplied to said chamber by said inlet means, said valve means comprising:
    first elongated hollow cylindrical wall means separating said inlet means from said outlet, said first wall means having a plurality of axially spaced annular grooves on an interior face and a plurality of cirucmferentially spaced orifices in each of said grooves communicating between said grooves and an exterior face of said first wall means;
    second elongated hollow cylindrical wall means disposed coaxially within said first wall means, said second wall means being axially movable with respect to said first wall means and having an exterior face slidably engaging said interior face of said first wall means, said second wall means having a plurality of axially spaced annular grooves on said exterior face thereof and a plurality of cirucmferentially spaced orifices in each of said grooves communicating between said grooves and an interior face of said second wall means, said second wall interior face defining an interior portion communicating with said outlet, and
    thermally responsive means disposed within said interior portion and connected to said second wall means for positioning said second wall means relative to said first wall means such that said annular grooves of said first and second wall means are in at least partial registry permitting bleed air to flow through said respective orifices and annular grooves from said inlet means to said outlet, said thermally responsive means being responsive to temperature of said bleed air for effecting movement of said seocnd wall means relative to said first wall means to move said annular grooves of said said second wall means toward a flow reducing position out of registry with said annular grooves of said first wall means as said bleed air temperature increases.

2. The thermo-modulating aircraft bleed air control valve of claim 1 wherein said orifices of said second wall means are radilaly aligned with said orifices of said first wall means to provide maximum flwo rate of bleed air through said valve means when respective annular grooves are in at least partial registry.

3. The thermo-modulating aircraft bleed air control valve of claim 1 wherein said first wall means is fixed relative to said valve chamber adjacent said inlet end, said first wall means having a free end portion adjacent said valve chamber output end disposed in sealed axially slidable relationship relative to said valve chamber.

4. The thermo-modulating aircraft bleed air control valve of claim 1 wherien said th ermally responsive means comprises:

a plurality of elongated hollow cylinders coaxially disposed one within another and within said interior portion of said second wall means, said cylinders beign serially interconnected at alternately opposite ends, an innermost one of said cylinders being fixed relative to said valve housing and an outermost one of said cylinders being interconnected with said second wall means, respective adjacent ones of said plurality of cylinders being formed of materials having relatively different coefficients of thermal expansion, an interior portion of said innermost one of said cylinders ommunicating with said outlet, and each of said plurality of cylinders having a plurality of axially elongated circumferentially spaced apart flow passages in respective walls thereof, said passages extending substantially along the entire length of said respective walls and said passages of each cylinder being radially aligned to provide said second wall means, through said flow passages to said outlet.

5. The thermo-modulating aircraft bleed air control valve of claim 4 wherein said first wall means comprises a radial end wall opposite said free end and said innermost cylinder is supported on said radial end wall and wherein said second wall means may be positionally adjusted relative to said first wall means by heat insulating washer means inserted between said radial end wall and said innermost cylinder.

6. The thermo-modulating aircraft bleed air control valve of claim 4 wherein said inlet means comprises an inlet of said valve chamber and solenoid controlled supply valve means in communication with said inlet and source of bleed air, said supply vlave means selectively interconnecting and disconnecting said inlet of said valve chamber with said source of bleed air.

7. The thermo-modulating aircraft bleed air control valve of claim 6 whereins id solenoid controlled supply valve means interconnects said valve chamber inlet with said bleed air source when deenergized and disconnects said valve chamber inlet with said bleed air source when energized.

8. The thermo-modulating aircraft bleed air control valve of claim 6 wherein said supply valve means comprises:

a poppet valve movable between an open position interconnecting said valve chamber inlet with said bleed air source and a closed position disconnecting said valve chamber inlet with said bleed air source;

biasing means at a first side of said poppet valve biasing said poppet valve toward said closed position, said bleed air source being directed at a second side of said poppet valve in opposition to said biasing means;

a fluid passage in communication between said bleed air source and said first side of said poppet valve;

a vent passage in communication with said first side of said poppet valve; and a solenoid operated control valve connected in said fluid passage and said vent passage, said solenoid operated control valve opening said vent passage when deenergized whereby pressure of said bleed air directed against said second side of said poppet valve overcomes said biasing means to move said poppet valve to said open position, and said solenoid operated control valve closing said vent passage and opening said fluid passage when energized whereby bleed air is supplied against both said first and second sides of said poppet valve and said biasing means moves said poppet valve to said closed position.

9. The thermo-modulating aircraft bleed air control valve of claim 8 wherein said supply valve means further comprises indicator means operated by said poppet valve indicating the open or closed positoin of said poppet valve.

* * * * *